United States Patent
Shaw et al.

(10) Patent No.: US 11,095,609 B2
(45) Date of Patent: *Aug. 17, 2021

(54) PORTAL FOR MANAGING ADMISSION OF UNRECOGNIZED DEVICES TO AN ENTERPRISE NETWORK

(71) Applicant: Sophos Limited, Abingdon (GB)

(72) Inventors: John Edward Tyrone Shaw, Oxford (GB); Ross McKerchar, Bristol (GB); Moritz Daniel Grimm, Bruchsal (DE); Jan Karl Heinrich Weber, Karlsruhe (DE); Shail R. Talati, Santa Clara, CA (US); Kenneth D. Ray, Seattle, WA (US); Andrew J. Thomas, Oxfordshire (GB)

(73) Assignee: Sophos Limited, Abingdon (GB)

( * ) Notice: Subject to any disclaimer, the term of this patent is extended or adjusted under 35 U.S.C. 154(b) by 280 days.

This patent is subject to a terminal disclaimer.

(21) Appl. No.: 15/885,361

(22) Filed: Jan. 31, 2018

(65) Prior Publication Data
US 2019/0238506 A1 Aug. 1, 2019

(51) Int. Cl.
*H04L 29/06* (2006.01)

(52) U.S. Cl.
CPC .......... *H04L 63/02* (2013.01); *H04L 63/0236* (2013.01); *H04L 63/0263* (2013.01);
(Continued)

(58) Field of Classification Search
CPC ... H04L 63/101; H04L 63/102; H04L 63/104; H04L 63/107; H04L 63/145; H04L 63/02;
(Continued)

(56) References Cited

U.S. PATENT DOCUMENTS 8,910,263 B1 * 12/2014 Martini ................. H04W 12/08
726/8
9,160,751 B2 * 10/2015 Martini ................. H04L 63/102
(Continued)

FOREIGN PATENT DOCUMENTS

WO WO-2018005143 1/2018

OTHER PUBLICATIONS

Jumelet, Arnaud et al., "Control the Health of Windows 10-Based Devices", Apr. 5, 2017, 32 pages.
(Continued)

*Primary Examiner* — Linglan E Edwards
(74) *Attorney, Agent, or Firm* — Strategic Patents, P.C.

(57) ABSTRACT

A threat management facility detects a device on an enterprise network and determines whether the device is one of a set of managed devices for the enterprise network. When the device is not one of the set of managed devices, the device may be directed to a portal that manages admission of unrecognized devices onto the enterprise network. Based on a response of the unrecognized device to the portal (e.g., if the unrecognized device does not respond to the portal), the device may be listed on an unclaimed device page published by the portal and accessible to authorized users of the enterprise network. An authorized user may claim the unrecognized device from the unclaimed device page and, in the process, may provide additional information regarding the unrecognized device. Once claimed, the previously unrecognized device may be permitted to communicate over the enterprise network.

19 Claims, 8 Drawing Sheets

(52) U.S. Cl.
CPC ........ *H04L 63/0876* (2013.01); *H04L 63/101* (2013.01); *H04L 63/102* (2013.01); *H04L 63/104* (2013.01); *H04L 63/107* (2013.01); *H04L 63/145* (2013.01); *H04L 63/029* (2013.01); *H04L 63/0272* (2013.01); *H04L 63/061* (2013.01)

(58) Field of Classification Search
CPC ............. H04L 63/0236; H04L 63/0263; H04L 63/0272; H04L 63/029; H04L 63/061; H04L 63/0876
See application file for complete search history.

(56) References Cited

U.S. PATENT DOCUMENTS

| | | | |
|---|---|---|---|
| 9,854,057 B2* | 12/2017 | Chari | H04L 63/1425 |
| 10,009,344 B2* | 6/2018 | Oberheide | H04L 63/0876 |
| 2006/0224742 A1* | 10/2006 | Shahbazi | H04W 12/0027 |
| | | | 709/226 |
| 2011/0047594 A1 | 2/2011 | Mahaffey et al. | |
| 2012/0204020 A1 | 8/2012 | Novak et al. | |
| 2013/0007848 A1* | 1/2013 | Chaskar | H04W 12/12 |
| | | | 726/4 |
| 2013/0305320 A1 | 11/2013 | Warrick et al. | |
| 2014/0007222 A1 | 1/2014 | Qureshi et al. | |
| 2014/0280913 A1 | 9/2014 | Karren et al. | |
| 2014/0282869 A1 | 9/2014 | Dabbiere | |
| 2014/0297840 A1 | 10/2014 | Qureshi | |
| 2015/0148020 A1 | 5/2015 | Laden et al. | |
| 2015/0199213 A1 | 7/2015 | Desai et al. | |
| 2015/0249617 A1 | 9/2015 | Chang et al. | |
| 2015/0373023 A1 | 12/2015 | Walker | |
| 2016/0080465 A1* | 3/2016 | Sasaki | H04L 67/025 |
| | | | 715/740 |
| 2017/0331708 A1 | 11/2017 | Memmott et al. | |
| 2018/0007046 A1* | 1/2018 | Oberheide | H04L 63/0876 |
| 2018/0270229 A1 | 9/2018 | Zhang et al. | |
| 2018/0332065 A1* | 11/2018 | Gupta | H04L 63/0853 |
| 2019/0238538 A1 | 8/2019 | Shaw et al. | |
| 2019/0238591 A1 | 8/2019 | Shaw et al. | |

OTHER PUBLICATIONS

ISA, "PCT Application No. PCT/US19/15831 International Search Report and Written Opinion dated Apr. 30, 2019", 12 pages.
USPTO, "U.S. Appl. No. 15/885,347 Non-Final Office Action dated Dec. 6, 2019", 11 pages.
USPTO, "U.S. Appl. No. 15/885,391 Non-Final Office Action dated Jan. 22, 2020", 18 pages.
USPTO, "U.S. Appl. No. 15/885,391 Final Office Action dated Jun. 11, 2020", 19 pages.
ISA, "PCT Application No. PCT/US19/15831 International Preliminary Report on Patentability dated Aug. 13, 2020", 8 pages.
USPTO, "U.S. Appl. No. 15/885,391 Non-Final Office Action dated Sep. 24, 2020", 16 pages.
USPTO, "U.S. Appl. No. 15/885,347 Non-Final Office Action dated Mar. 3, 2021", 28 pages.
USPTO, "U.S. Appl. No. 15/885,391 Notice of Allowance dated Jan. 25, 2021", 8 pages.

* cited by examiner

PORTAL FOR MANAGING ADMISSION OF UNRECOGNIZED DEVICES TO AN ENTERPRISE NETWORK

BACKGROUND

Enterprise networks can contain valuable information that forms an increasingly attractive target for malicious actors. To limit the risk posed by such malicious actors, access to enterprise networks is often restricted to managed devices. In many instances, it is useful or desirable add certain unmanaged devices to the enterprise network, provided that such unmanaged devices can be brought into compliance with one or more policies of the enterprise network. As networked devices become increasingly ubiquitous and provide increasingly diverse functionality, however, adding unmanaged devices to an enterprise network can require significant administrator resources. Thus, there remains a need for managing admission of devices to an enterprise network while protecting managed devices on the enterprise network and making efficient use of administrator resources.

SUMMARY

A threat management facility detects a device on an enterprise network and determines whether the device is one of a set of managed devices for the enterprise network. When the device is not one of the set of managed devices, the device may be directed to a portal that manages admission of unrecognized devices onto the enterprise network. Based on a response of the unrecognized device to the portal (e.g., if the unrecognized device does not respond to the portal), the device may be listed on an unclaimed device page published by the portal and accessible to authorized users of the enterprise network. An authorized user may claim the unrecognized device from the unclaimed device page and, in the process, may provide additional information regarding the unrecognized device. Once claimed, the previously unrecognized device may be permitted to communicate over the enterprise network.

In one aspect, a method includes detecting a device on an enterprise network, permitting the device to communicate over the enterprise network when the device provides a heartbeat to a threat management facility that identifies the device as one of a set of managed devices for the enterprise network, and, when the device does not provide a heartbeat to the threat management facility that identifies the device as one of the set of managed devices, directing the device to a portal for admission of unrecognized devices onto the enterprise network, determining a response of the device to the portal, and, based on the response of the device to the portal, listing the device on an unclaimed device page published by the portal and accessible to authorized users of the enterprise network. In certain implementations, the method may include receiving, from an authorized user of the enterprise network, a claim for the device from the unclaimed device page. Additionally, or alternatively, the method may include permitting the device to communicate over the enterprise network based on the claim for the device from the unclaimed device page.

According to another aspect, a computer program product may be encoded on one or more non-transitory computer storage media, and the computer program product may include instructions that, when executed by one or more computing devices, cause the one or more computing devices to perform operations including detecting a device on an enterprise network, permitting the device to communicate over the enterprise network, when the device provides a heartbeat to a threat management facility that identifies the device as one of a set of managed devices for the enterprise network, and, when the device does not provide a heartbeat to the threat management facility that identifies the device as one of the set of managed devices, directing the device to a portal for admission of unrecognized devices onto the enterprise network, determining a response of the device to the portal, and, based on the response of the device to the portal, listing the device on an unclaimed device page published by the portal and accessible to authorized users of the enterprise network. In certain implementations, the operations may further include receiving, from an authorized user of the enterprise network, a claim for the device from the unclaimed device page. Additionally, or alternatively, the operations may further include permitting the device to communicate over the enterprise network based on the claim for the device from the unclaimed device page.

According to yet another aspect, a system includes a portal for managing admission of unrecognized devices onto an enterprise network, the portal configured to publish an unclaimed device page accessible to authorized users of an enterprise network, and a threat management facility associated with the enterprise network and in communication with the portal, the threat management facility configured to identify the device as one of a set of managed devices for the enterprise network, to permit the device to communicate over the enterprise network when the device is one of the set of managed devices, and, when the device is not one of the set of managed devices, to list the device on the unclaimed device page published by the portal and accessible to the authorized users of the enterprise network. In certain implementations, the portal may be configured to receive, from one or more of the authorized users of the enterprise network, a claim for the device from the unclaimed device page. Additionally, or alternatively, the threat management facility may be configured to permit the device to communicate over the enterprise network based on the claim for the device from the unclaimed device page.

Implementations may include one or more of the following features.

In certain implementations, receiving the claim for the device may include registering the device in a database stored by the threat management facility.

In some implementations, determining the response of the device to the portal may be based on a response of the device to being directed to a landing page published by the portal. As an example, the device may be listed on the unclaimed device page published by the portal if the device does not respond to the landing page.

In certain implementations, listing the device on the unclaimed device page may be further based on a fingerprint of the device. For example, the fingerprint of the device may be based on one or more of network traffic, packet header information, or status reports obtained from communications by the device.

In some implementations, listing the device on the unclaimed device page may be further, or instead, based on associating the device with another device.

In certain implementations, listing the device on the unclaimed device page may further, or in the alternative, include performing a security scan of the device for compliance with a security policy.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term "or" should generally be understood to mean "and/or" and, similarly, the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
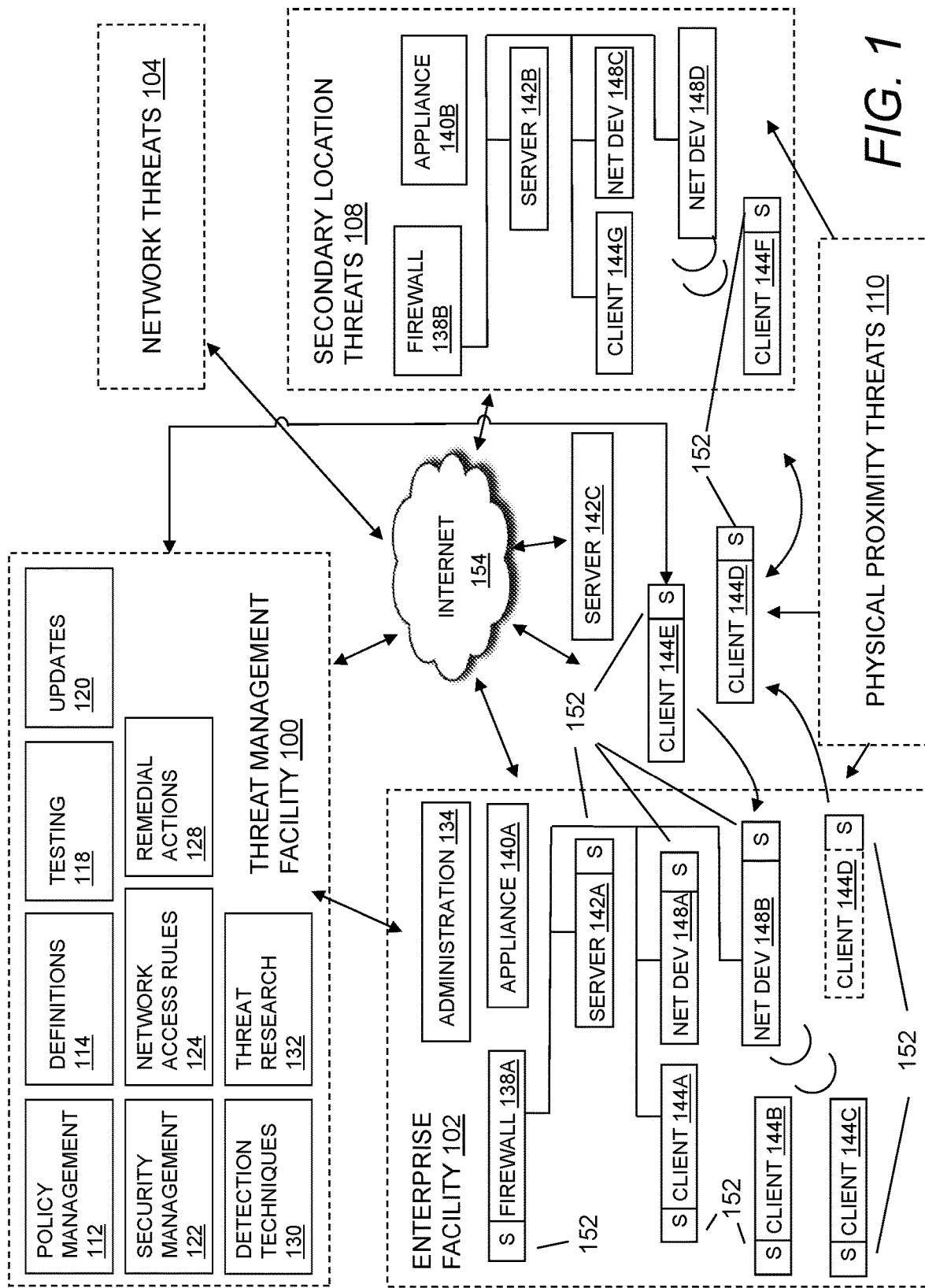
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, a policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management facility 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated implementation of the threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to the enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide the enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the computer network of the enterprise facility 102 may be distributed amongst a plurality of facilities, and in a plurality of geographical locations, and may include an administration facility 134, a firewall 138A, a threat management appliance facility 140A, a server facility 142A, network devices 148A-B, clients 144A-D, such as protected by one or more endpoint computer security facilities 152, and the like. It will be understood that any reference herein to client facilities may include the clients 144A-D shown in FIG. 1 and vice-versa. The threat management facility 100 may include a plurality of functions, such as a security management facility 122, the policy management facility 112, an update facility 120, a threat definitions facility 114, a network access rules facility 124, a remedial action facility 128, a detection techniques facility 130, a testing facility 118, a threat research facility 132, and the like. In embodiments, the threat protection provided by the threat management facility 100 may extend beyond the network boundaries of the enterprise facility 102 to include the clients 144D (or client facilities) that have moved into network connectivity not directly associated or controlled by the enterprise facility 102. Threats to client facilities may come from a plurality of sources, such as from network threats 104, physical proximity threats 110, threats at the secondary location 108, and the like. The clients 144A-D may be protected from threats even when the client 144A-D is not located in association with the enterprise facility 102, such as when a client 144E-F moves in and out of the enterprise facility 102, for example when interfacing with an unprotected server facility 142C through the Internet 154, when the client 144F is moving into a threat at the secondary location 108 such as interfacing with components 140B, 142B, 148C, 148D that are not protected, and the like. In embodiments, the threat management facility 100 may protect the enterprise facility 102 from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to the enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The email security and control of the security management facility 122 may protect against inbound and outbound threats, protect email infrastructure, prevent data leakage, provide spam filtering, and the like. In an embodiment, the security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of networks of the enterprise facility 102, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without direct control by the administration facility 134, manually transmitted by the administration facility 134, or otherwise distributed. The security management facility 122 may manage the receipt of malicious code descriptions from a provider, distribution of the malicious code descriptions to the enterprise facility 102 networks, distribution of the malicious code descriptions to client facilities, and so forth.

The threat management facility 100 may provide the policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate the enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of the enterprise facility 102 external network locations/applications that may or may not be accessed by the client facility. The policy management facility 112 may include rules that may be interpreted with respect to the enterprise facility 102 network access request to determine if the request should be allowed. The rules may provide a generic rule for the type of access that may be granted. The rules may be related to the policies of the enterprise facility 102 for access rights for the client facility of the enterprise facility 102. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of the enterprise facility 102 wide access rules and policies that may be distributed to maintain control of client facility access to the enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of a server facility 142 of the network, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus the update facility 120 may be provided by the threat management facility 100. In addition, the policy management facility 112 may also require update management (e.g., as provided by the update facility 120 herein described). The update management for the security management facility 122 and the policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security management facility 122 and the policy management facility 112 may push information to the enterprise facility 102 network and/or client facility. The enterprise facility 102 network and/or client facility may also or instead pull information from the security management facility 122 and the server facility 142 of the policy management facility 112, or there may be a combination of pushing and pulling of information between the server facilities of the security management facility 122 and the policy management facility 112, network of the enterprise facility 102, and client facilities, or the like. For example, the enterprise facility 102 network and/or client facility may pull information from the security management facility 122, and the server facility 142 of the policy management facility 112 may request the information using the security management facility 122 and the policy management facility 112 update module; the request may be based on a certain time period, by a certain time, by a date, on demand, or the like. In another example, the server facility 142 of the security management facility 122 and the policy management facility 112 may push the information to the network of the enterprise facility 102 and/or client facility of the enterprise facility 102 by providing notification that there are updates available for download and then transmitting the information. The combination of the server facility 142 and security update module of the security management facility 122 may function substantially the same as the network server and policy update module of the policy management facility 112 by providing information to the enterprise facility 102 network and the client facility in a push or pull method. In an embodiment, the policy management facility 112 and the security management facility 122 management update modules may work in concert to provide information to the network of the enterprise facility 102 and/or client facility of the enterprise facility 102 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by the security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from the update facility 120 within the network, may request updated definition files from a computing facility external to the network, updated definition files may be provided to the client facility from within the network, definition files may be provided to the client facility from an external computing facility from an external network, or the like.

The threat definitions facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or information of the policy management facility 112. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

The network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rules facility 124 may have a generic set of rules that may be in support of network access policies of the enterprise facility 102, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rules facility 124 may provide updated rules and policies to the enterprise facility 102. The network access rules facility 124 may be maintained by the administration facility 134, using network access rules facility 124 management. In an embodiment, the administration facility 134 may be able to maintain a set of access rules manually by adding rules, changing rules, deleting rules, or the like. Additionally, the administration facility 134 may retrieve predefined rule sets from a remote provider of a set of rules to be applied to the enterprise facility 102 (e.g., the entire enterprise facility). The administration facility 134 may be able to modify the predefined rules as needed for a particular instance of the enterprise facility 102 using the network access rules facility 124.

When a threat or policy violation is detected by the threat management facility 100, the threat management facility 100 may perform or initiate the remedial action facility 128. Remedial action may take a plurality of forms, such as terminating or modifying an ongoing process or interaction, sending a warning to a client or the administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to the administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, the server facility 142, the administration facility 134, the firewall 138A, gateway, the network devices 148 (e.g., hubs and routers), the threat management appliance facility 140A, desktop users, mobile users, and the like. In embodiments, it may be the endpoint computer security facility 152, located on a computer's desktop, which may provide threat protection to a user, and associated instance of the enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the networked computer-based infrastructure of the enterprise facility 102. For instance, computer support components provided as the network devices 148 (e.g., hubs and routers), the server facility 142, the firewall facility 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as the server facility 142, via a network. The server facility 142 of the client facility model may apply to a plurality of networked applications, such as a client facility connecting to the server facility 142 (e.g., an application server) of the enterprise facility 102, a web browser client facility connecting to the server facility 142 (e.g., a web server), an e-mail client facility retrieving e-mail from the server facility 142 of an Internet service provider (e.g., the Internet service provider's mail storage servers), and the like. In embodiments, traditional large client facility applications may be switched to websites, which may increase the browser's role as a client facility. The clients 144 may be classified as a function of the extent to which they perform their own processing. For instance, the clients 144 are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients may include CURI, Delphi, Droplets, Java, win32, 511, and the like. Thin clients may offer minimal processing capabilities, for instance, the thin client facility may primarily provide a graphical user interface provided by the server facility 142 (e.g., an application server facility), which may perform the bulk of any required data processing. Programming environments for thin clients may include JavaScript/AJAX, ASP, JSP, Ruby on Rails, Python's Django, PHP, and the like. The client facility may also be a mix of the two, such as processing data locally, but relying on the server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. The server facility 142, which may also be referred to as a server facility application, server facility operating system, server facility computer, or the like, may be an application program or operating system that accepts client facility connections to service requests from the clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all applications of the server facility 142 may run on a single computer and under heavy load conditions a single application of the server facility 142 may run on multiple computers. In embodiments, the threat management facility 100 may provide threat protection to server facilities 142 within the enterprise facility 102 as load conditions and application changes are made.

The server facility 142 may also be a threat management appliance facility 140, where the threat management appliance facility 140 provides specific services onto the network. Though the threat management appliance facility 140 is the server facility 142 computer, that may be loaded with the server facility 142 operating system and the server facility 142 application, the enterprise facility 102 user may not need to configure it, as the configuration may have been performed by a third party. In an embodiment, the enterprise facility 102 appliance may be the server facility 142 appliance that has been configured and adapted for use with the threat management facility 100, and located within the facilities of the enterprise facility 102. The threat management appliance of the enterprise facility 102 may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without the threat management appliance facility 140 located within the enterprise facility 102. In this instance, the appliance functionality may be a shared hardware product between pluralities of the enterprise facility 102. In embodiments, the threat management appliance facility 140 may be located at the enterprise facility 102, where the enterprise facility 102 maintains a degree of control. In embodiments, a hosted service may be provided, where the threat management appliance facility 140 may still be an on-site black box to the enterprise facility 102, physically placed there because of infrastructure requirements, but managed by a third party, vendor, or the like.

Simple appliances of the server facility 142 may also be utilized across the network infrastructure of the enterprise facility 102, such as switches, routers, wireless routers, hubs and routers, gateways, print servers, net modems, and the like. These simple server facility appliances may not require configuration by the enterprise facility 102, but may require protection from threats via the endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by the endpoint computer security facility 152 is the firewall 138A, which may be a hardware or software device that may be configured to permit, deny, or proxy data through a computer network that has different levels of trust in its source of data. For instance, an internal network of the enterprise facility 102 may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities represent boundaries between threat levels, the endpoint computer security facility 152 associated with the firewall 138A may provide resources that may control the flow of threats at this enterprise facility 102 network entry point. The firewall 138A, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall 138A or gateway; at the server facility 142; at distribution points within the network, i.e. the network devices 148 (e.g., hubs and routers); at the desktop of client facility computers; and the like. In embodiments, the most effective location for threat detection may be at the endpoint computer security facility 152 at the user's computer desktop.

The interface between the threat management facility 100 and the enterprise facility 102, and through the threat management appliance facility 140A to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from the enterprise facility 102 components to the threat management facility 100, and the like. In embodiments, automatic interactions between the enterprise facility 102 and the threat management facility 100 may be configured by the threat management facility 100 and the administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to the enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of the network devices 148A that are wired or wireless network facilities 148B. Client facilities connected to the enterprise facility 102 network via the wired network device 148A or the wireless network facility 148B may receive similar protection, as both connection types are ultimately connected to the same network of the enterprise facility 102, with the same instance of the endpoint computer security facility 152, and the same threat protected environment of the enterprise facility 102. Mobile enterprise facility clients 144B-F, because of their ability to connect to any network access point (e.g., one or more of the wireless network facility 148B and the wireless network facility 148D), may connect to the Internet 154 outside the enterprise facility 102, and therefore outside the threat-protected environment of the enterprise facility 102. In this instance, the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the mobile client facility (e.g., the clients 144 D-F) that is outside of the enterprise facility 102 and that has an embedded instance of the endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via respective embedded instances of the endpoint computer security facility 152.

Interactions between the threat management facility 100 and the components of the enterprise facility 102, including mobile client facility extensions of the enterprise facility 102, may ultimately be connected through the Internet 154. The threat management facility 100 downloads and upgrades to the enterprise facility 102 may be passed from the firewalled networks of the threat management facility 100 through to the endpoint computer security facility 152 equipped components of the enterprise facility 102. In turn, the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the mobile enterprise facility clients 144B-F) equipped with the endpoint computer security facility 152, but in embodiments, as long as the mobile client facility is embedded with the endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the endpoint computer security facility 152 of the client 144 may manage actions in unprotected network environments such as when the client facility (e.g., the client 144F) is in the secondary location 108 or connecting wirelessly to a non-enterprise facility wireless Internet connection, where the endpoint computer security facility 152 may dictate what actions are allowed, blocked, modified, or the like. For instance, if the endpoint computer security facility 152 of the client 144 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities as a part of its computer components, such as its firewalls 138B, servers 142B, clients 144G, network facilities 148C-D (e.g., hubs and routers), and the like. As a result, the computer components of the secondary location 108 may be open to threat attacks, and become potential sources of threats, as well as any mobile enterprise facility clients 144B-F that may be connected to the network of the secondary location 108. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the client facility of the enterprise facility 102, such as through a USB port, or in physical proximity with the client facility of the enterprise facility 102 such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at the secondary location 108, and the like. A mobile device, once connected to an unprotected computer resource, may become a physical proximity threat 110. In embodiments, the endpoint computer security facility 152 may provide computing resources of the enterprise facility 102 with threat protection against physical proximity threats 110, for instance, through scanning the device prior to allowing data transfers, through security validation certificates, through establishing a safe zone within the computing resource of the enterprise facility 102 to transfer data into for evaluation, and the like.

Having provided an overall context for threat detection, the description now turns to a brief discussion of an example of a computer system that may be used for any of the entities and facilities described above.

Figure 2:
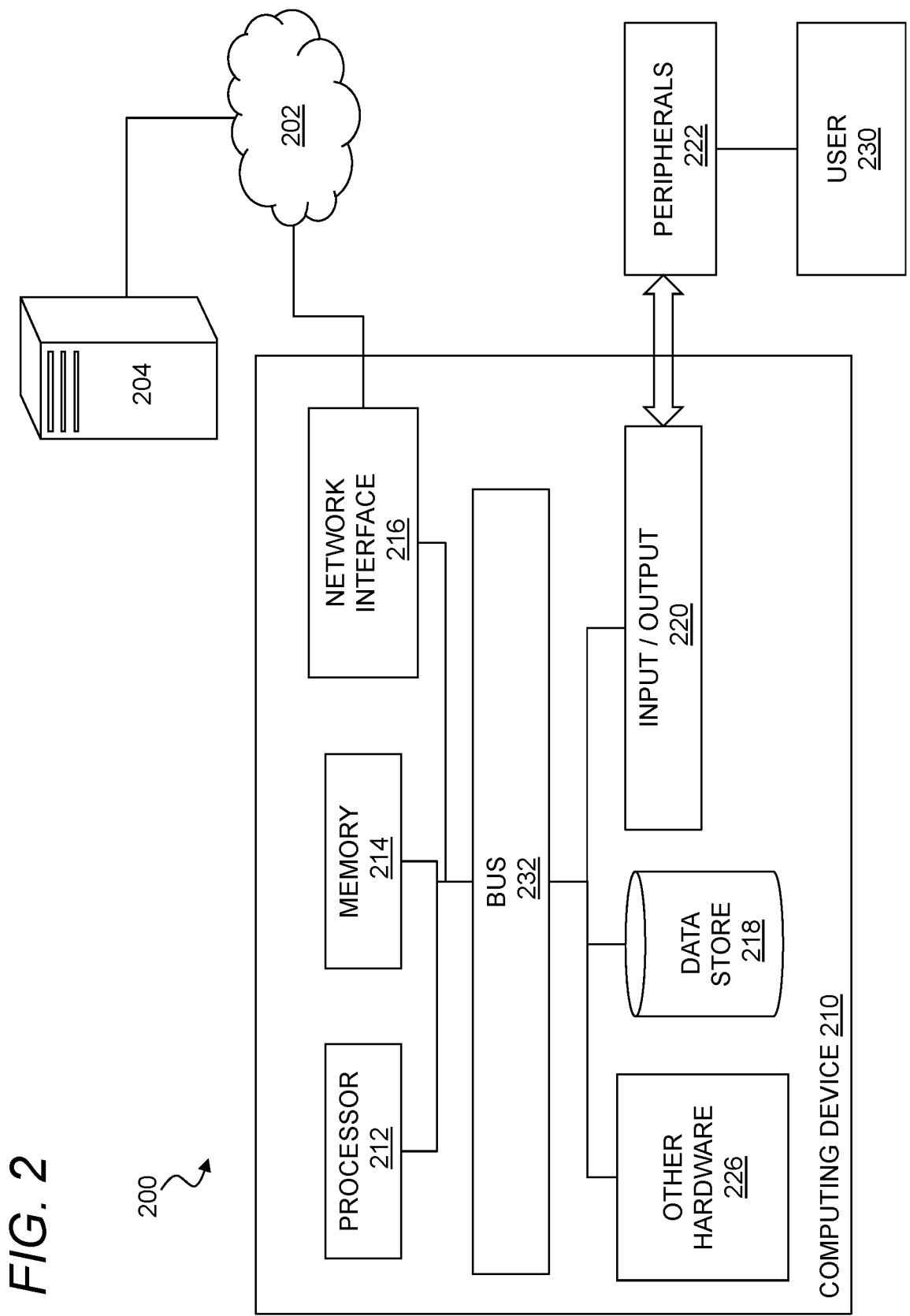
FIG. 2 illustrates a computer system.

FIG. 2 illustrates a computer system. In general, a computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over the network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output interfaces 220. The computing device 210 may further include or be in communication with peripherals 222 and other external input/output devices 224.

The processor 212 may be any as described herein, and may generally be capable of processing instructions for execution within the computing device 210 or the computer system 200. The processor 212 may include a single-threaded processor or a multi-threaded processor. The processor 212 may be capable of processing instructions stored in the memory 214 or on the data store 218.

The memory 214 may store information within the computing device 210 or the computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 210 and configuring the computing device 210 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 210 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to the network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output interfaces 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or the computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 210. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 210 may be used as a peripheral 222 as contemplated herein.

Other hardware 226 may be incorporated into the computing device 210 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A system bus 232 or combination of busses may serve as an electromechanical platform for interconnecting components of the computing device 210 such as the processor 212, memory 214, the network interface 216, the other hardware 226, data store 218, and input/output interface. As shown in the figure, each of the components of the computing device 210 may be interconnected using the system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 210 may be deployed as a number of parallel processors synchronized to execute code together for improved performance, or the computing device 210 may be realized in a virtualized environment where software on a hypervisor or other virtualization management facility emulates components of the computing device 210 as appropriate to reproduce some or all of the functions of a hardware instantiation of the computing device 210.

Figure 3:
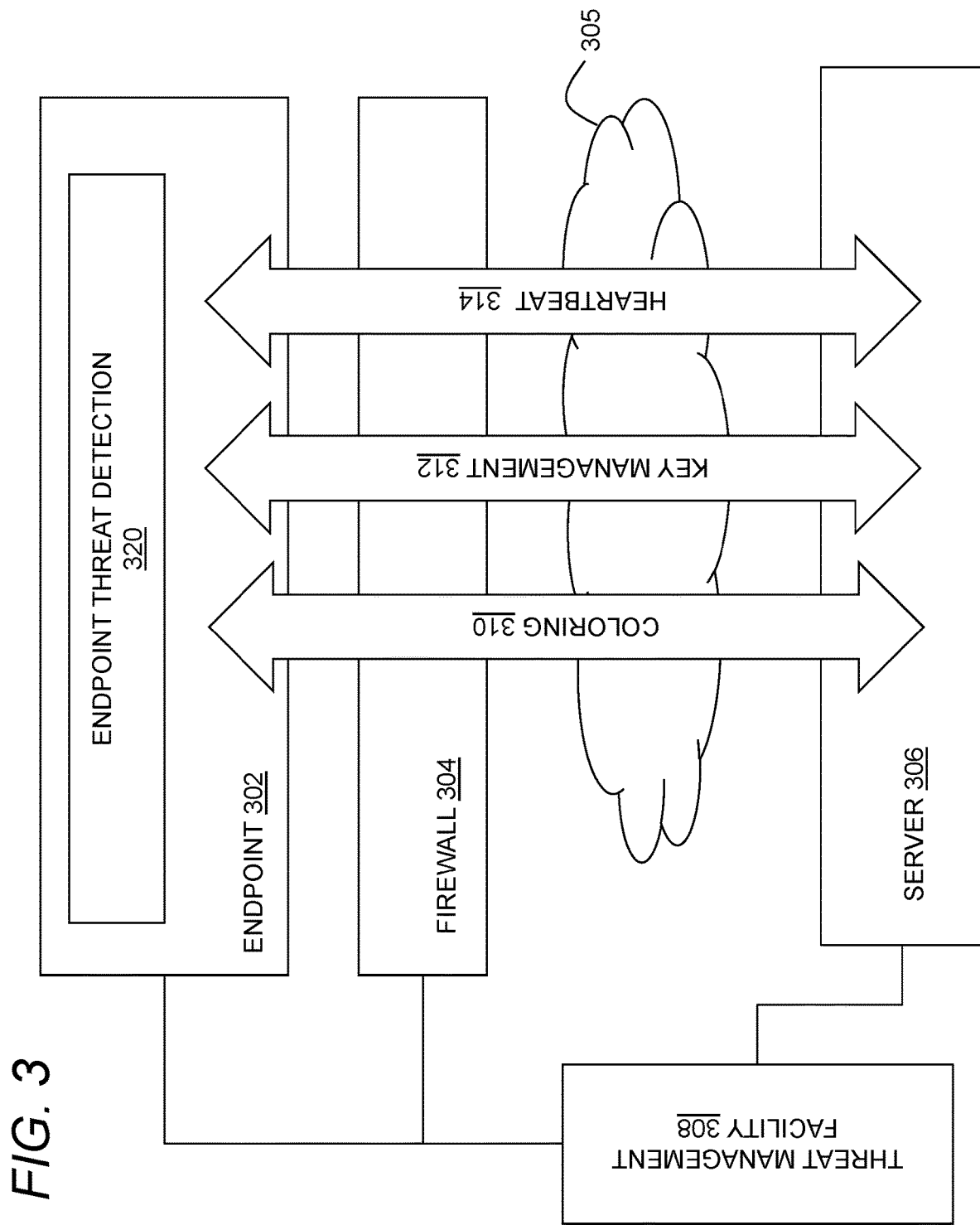
FIG. 3 illustrates a threat management system.

FIG. 3 illustrates a threat management system as contemplated herein. In general, the system may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein.

The key management system 312 may support management of keys for the endpoint 302 to selectively permit or prevent access to content on the endpoint 302 on a file-specific basis, a process-specific basis, an application-specific basis, a user-specific basis, or any other suitable basis to prevent data leakage, and to support more fine-grained and immediate control over access to content on the endpoint 302 when a security compromise is detected. Thus, for example, if a particular process executing on the endpoint is compromised, or potentially compromised or otherwise under suspicion, keys to that process may be revoked to prevent, e.g., data leakage or other malicious activity.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on any useful schedule. A suitable heartbeat system is described in greater detail below with reference to FIG. 4.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
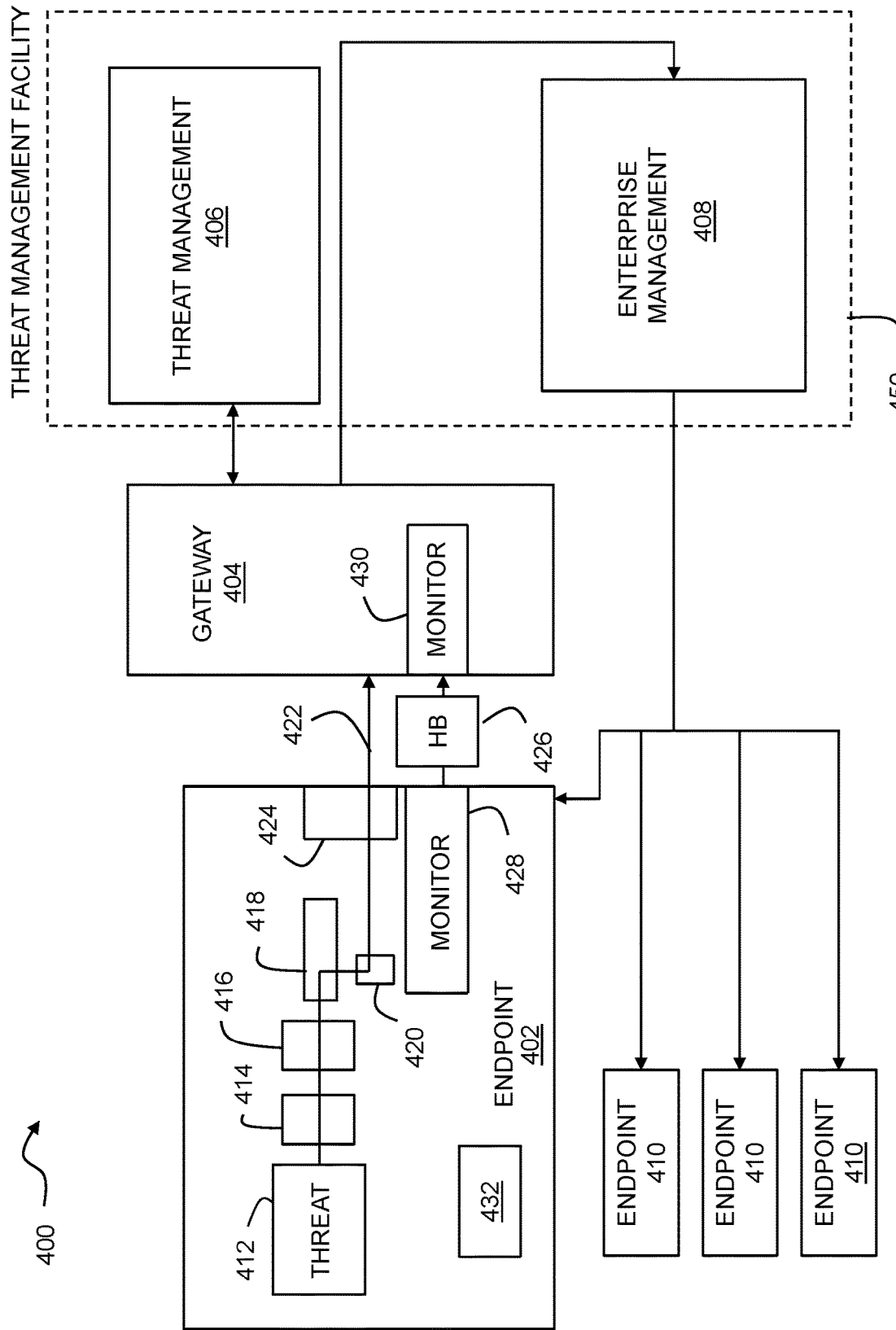
FIG. 4 illustrates a threat management system using heartbeats.

FIG. 4 illustrates a threat management system using heartbeats. In general, a system 400 may include an endpoint 402, a gateway 404, a threat management system 406, and an enterprise management system 408 that manages an enterprise including the endpoint 402, the gateway 404, and one or more additional endpoints 410. Each of these components may be configured with suitable programming to participate in the detection and remediation of an advanced persistent threat (APT) or other malware threat as contemplated herein.

The endpoint 402 may be any of the endpoints described herein, or any other device or network asset that might join or participate in an enterprise network. The endpoint 402 may contain a threat 412 such as an advanced persistent threat, virus, or similar malware that resides on the endpoint 402. The threat 412 may have reached the endpoint 402 in a variety of ways, and may have been placed manually or automatically on the endpoint 402 by a malicious source. It will be understood that the threat 412 may take any number of forms and have any number of components. For example, the threat 412 may include an executable file that can execute independently, or the threat 412 may be a macro, plug-in, or the like that executes within another application. Similarly, the threat 412 may manifest as one or more processes or threads executing on the endpoint 402. The threat 412 may install from a file on the endpoint 402 or a file remote from the endpoint 402, and the threat 412 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 412 may be analyzed by one or more threat countermeasures on the endpoint 402 such as a whitelisting filter 414 that approves each item of code before executing on the endpoint 402 and prevents execution of non-whitelisted code. The endpoint 402 may also include an antivirus engine 416 or other malware detection software that uses any of a variety of techniques to identify malicious code by reputation or other characteristics. A runtime detection engine 418 may also monitor executing code to identify possible threats. More generally, any of a variety of threat detection techniques may be applied to the threat 412 before and during execution. In general, a threat 412 may evade these and other security measures and begin executing as a process 420 on the endpoint 402.

Network traffic 422 from the process 420 may be monitored and logged by a traffic monitor 424 on the endpoint 402. The traffic monitor 424 may, for example, logs a time and a source of each network request from the endpoint 402. Where the endpoint 402 is within an enterprise network, the network traffic 422 may pass through the gateway 404 in transit to a data network such as the Internet. While the gateway 404 may be logically or physically positioned between the endpoint 402 and an external data network, it will be understood that other configurations are possible. For example, where the endpoint 402 is associated with an enterprise network but operating remotely, the endpoint 402 may form a VPN or other secure tunnel or the like to the gateway 404 for use of a threat management system 406, enterprise management system 408, and any other enterprise resources.

The endpoint 402 may use a heartbeat 426 to periodically and securely communicate status to the gateway 404. The heartbeat 426 may be created by a health monitor 428 within the endpoint 402, and may be transmitted to a remote health monitor 430 at the gateway 404. The health monitor 428 may monitor system health in a variety of ways, such as by checking the status of individual software items executing on the endpoint 402, checking that antivirus and other security software is up to date (e.g., with current virus definition files and so forth) and running correctly, checking the integrity of cryptographic key stores, checking for compliance with enterprise security policies, and checking any other hardware or software components of the endpoint 402 as necessary or helpful for health monitoring. The health monitor 428 may thus condition the issuance of a heartbeat 426 on a satisfactory status of the endpoint 402 according to any suitable criteria, enterprise policies, and other evaluation techniques.

The heartbeat 426 may be secured in any suitable manner so that the remote health monitor 430 can reliably confirm the source of the heartbeat 426 and the status of the endpoint 402. To this end, the heartbeat 426 may be cryptographically signed or secured using a private key so that the remote health monitor 430 can authenticate the origin of the heartbeat 426 using a corresponding public key. In one aspect, the heartbeat 426 may include a combination of plaintext information and encrypted information, such as where the status information for the endpoint is provided in plaintext while a digital signature for authentication is cryptographically secured. In another aspect, all of the information in the heartbeat 426 may be encrypted.

In one aspect, a key vault 432 may be provided on the endpoint to support cryptographic functions associated with a secure heartbeat. An obfuscated key vault 432 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 432, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

Robustness of the heartbeat 426 may usefully provide defensive mechanisms against reverse engineering of obfuscated content (e.g., the private key material stored in key vault 432, the code used to validate the correct running of the remainder of the systems as part of the heartbeat 426 code itself) and any anti-lifting protections to prevent malware from directly using the endpoint 402 (or the health monitor 428 on the endpoint 402) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 426 code itself.

A variety of useful techniques may be employed to improve security of the key vault 432 and the heartbeat 426. For example, the system may use domain shifting so that original key material is inferred based on hardware and software properties readily available to the key vault 432, and to ensure that key material uses non-standard algorithms. Software properties may, for example, include readily determined system values such as hashes of nearby code. In another aspect, the keys may be domain shifted in a manner unique to the endpoint 402 so that the manner of statistical validation of call stacks and core software is unique to the endpoint 402. Further the key vault may be provisioned so that a public key stored in the key vault 432 is signed with a certificate (or into a certificate chain) that can be externally validated by a network appliance or other trusted third party or directly by the health monitor.

The heartbeat 426 may encode any useful status information, and may be transmitted from the endpoint 402 on any desired schedule including any periodic, aperiodic, random, deterministic, or other schedule. Configured in this manner, the heartbeat 426 can provide secure, tamper-resistant instrumentation for status of the endpoint 402, and in particular an indication that the endpoint 402 is online and uncompromised. A disappearance of the heartbeat 426 from the endpoint 402 may indicate that the endpoint 402 has been compromised; however, this may also simply indicate that the endpoint 402 has been powered off or intentionally disconnected from the network. Thus, other criteria may be used in addition to the disappearance or interruption of the heartbeat 426 to more accurately detect malicious software. Some such techniques are described below, but it will be understood that this may include any supplemental information that might tend to make an attack on the endpoint 402 more or less likely. For example, if the heartbeat 426 is interrupted but the endpoint 402 is still sourcing network traffic, then an inference might suitably be made that the endpoint 402 is compromised.

The threat management system 406 may, in general, be any of the threat management systems described herein. The enterprise management system 408 generally provides tools and interfaces for administration of the enterprise and the one or more additional endpoints 410 and other resources or assets attached thereto. It will be understood that, the functions of the threat management system 406 and the enterprise management system 408 may vary, and general threat management and administration functions may be distributed in a variety of ways between and among these and other components. This is generally indicated in FIG. 4 as a threat management facility 450 that includes the threat management system 406 and the enterprise management system 408. It will be understood that either or both of these systems may be administered by third parties on behalf of the enterprise, or managed completely within the enterprise, or some combination of these, all without departing from the scope of this disclosure. It will similarly be understood that a reference herein to a threat management facility 450 is not intended to imply any particular combination of functions or components, and shall only be understood to include such functions or components as explicitly stated in a particular context, or as necessary to provide countermeasures for advanced persistent threats as contemplated herein.

Figure 5:
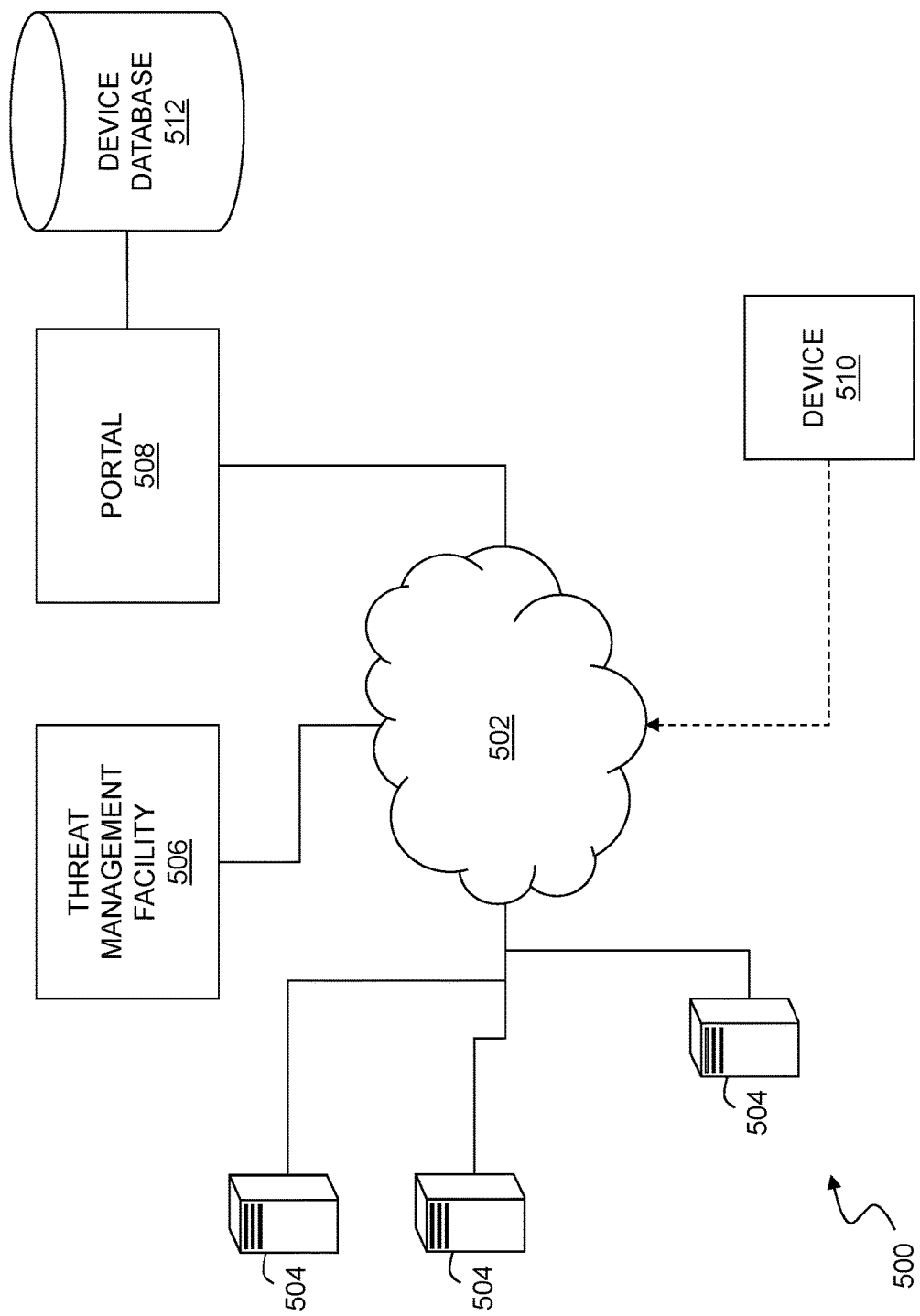
FIG. 5 illustrates a system with a new device joining a network.

FIG. 5 illustrates a system 500 with a new device (e.g., endpoints 504, device 510) joining a network 502 (e.g., an enterprise network). The system 500 may include a network 502 such as any of the enterprise networks described herein, or any other data network, combination of data networks or the like coupling the endpoints 504 such as any of the endpoints 504 described herein in, which are shown in a communicating relationship with one another. The system 500 may also include a threat management facility 506 such as any of the threat management facilities described herein to administer enterprise network policies and manage network security for devices such as the endpoints 504 within the network 502. Although not depicted in FIG. 5, it will be appreciated that the network 502 may also include any number of additional network devices, hardware, virtual machines, servers, routers, gateways, wireless and wired networks, virtual private network (VPN) connections, and so forth.

The system 500 may include a portal 508 for managing entry of new devices onto the network 502. When a new device such as the device 510 connects to the network 502, e.g., by connecting to a router physically through an Ethernet port or by connecting wirelessly to a wireless access point or other wireless air interface, the device 510 may be directed to the portal 508 to manage whether and how the device 510 is permitted to use the network 502 and network resources. For example, network requests from the device 510 may be directed to the portal 508. This may, for example, be accomplished through an HTTP redirect or other suitable technique for handling HTTP connections within the network 502.

The portal 508 may receive network requests from new devices and provide entry management capability. It will be appreciated that while the portal 508 is depicted as a separate entity, the portal 508 may be implemented within the threat management facility 506 or any other network device such as a switch, router, gateway, firewall, wireless access point, or other device associated with the network 502. In some cases, the portal 508 may be interposed between the system 500 and the Internet. In some cases, the portal 508 may be in communication with devices that are interposed between the system 500 and the Internet, such as a gateway or firewall, allowing for observation or interception of network traffic to or from the device 510. The portal 508 may recognize new devices using any suitable techniques including, without limitation, by maintaining a table of known devices and corresponding identifiers or by using a MAC address, DUID, or other machine identifier. In another aspect, the portal 508 may receive a heartbeat (or, if the device 510 does not initially offer a heartbeat, the portal 508 may explicitly request a heartbeat) that may be digitally signed or otherwise cryptographically secured in a manner that permits authentication of the identity of the device 510, e.g., with reference to an external trust authority. The portal 508 may request heartbeat information associated with the device 510 from another network device, such as a gateway, the threat management facility 506, or one or more of the endpoints 504 that may have access to heartbeat information from the device 510. The heartbeat information may indicate the status of the device 510 whether the device currently is being managed and with respect to the status and capabilities of the device.

Where the device 510 does not initially provide identifying information, the portal 508 may attempt to identify the device 510 using any suitable techniques. This may include active techniques, passive techniques, or any combination of these.

For example, active techniques may include any techniques actively managed by the portal 508 (and/or threat management facility 506) for querying or interacting with the device 510. In one aspect, for a device that has a user interface, the portal 508 may present a web page to the device 510 that interactively guides a user of the device 510 through a network entry procedure. Thus, the portal 508 may include a web portal or other server, content or the like for interactively identifying the device 510 in a user-guided process. For example, the web page may request credentials that identify the device 510, or a user of the device 510, as an authorized or recognized network participant. Where the device or user is unrecognized, the web page may guide a user through a registration process that gathers sufficient information to identify the user going forward, and/or that brings the device 510 into compliance with a network security policy for an enterprise network, e.g., by checking for the presence of security software, installing a local security agent, checking for software versions and updates, scanning for viruses and so forth. The portal 508 may also or instead provide a cookie or other identifiable file or data object to the device 510 that the device 510 can later use to identify itself on the network 502.

Active techniques also may include any techniques actively managed by the device 510. For example, the device 510 may initiate communications on the network by generating and communicating a secure heartbeat, or by launching a local security agent that handshakes with the portal 508 or threat management facility 506. As noted above, various active techniques may also be used in combination. For example, the device 510 may initiate communications on the network 502 by communicating data packets through a wireless access point or the like. When the device 510 is directed to the portal 508 as a new device, the portal 508 may initially attempt to programmatically verify the identity of the device 510, e.g., by attempting to query a local security agent on the device 510. If this is successful, the local security agent may respond to the query from the portal 508 by generating and responding with a secure heartbeat that can be used by the portal 508 to verify the identity of the device 510. More generally, any techniques by which the portal 508 and the device 510 can cooperate to identify reliably the device 510 and/or to admit the device 510 onto the network 502 may be used to control access to the network 502 as contemplated herein.

Active techniques also may include actively testing the response of the device 510 to network requests. For example, if the device 510 provides a web server, the web server on the device 510 may be queried for information. A management page of the device 510, for example, may provide information about the type of the device 510, a configuration of the device 510, an identifier for the device 510 (e.g., serial number), and so forth. For example, if the device 510 responds to Simple Network Management Protocol (SNMP) requests, the response of the device 510 to SNMP requests may be determined, potentially providing information about the type of the device 510, the configuration of the device 510, an identifier for the device 510, and so forth. Likewise, for any other protocol, whether common (e.g., telnet, ftp, ssh, sftp, ntp, dns, smb, etc.) or device-specific (e.g., remote control protocol specific to a brand of television, in instances in which such a protocol is applicable) a network request made to the device 510 may provide information about the device 510, and so an opportunity to determine the type of device 510 and/or the status of the device 510. For example, if the device 510 provides a capability to communicate via ssh, the ssh protocol may include the device 510 providing a key that is relatively unique to the device 510. Network requests may be originated by the portal 508 or the portal 508 may request that another device (e.g., firewall, gateway, one or more of the endpoints 504, the threat management facility 506) initiate one or more network requests, and the response(s) provided to the portal 508. For example, if the device makes a web request, a response to the web request may be intercepted, and detection code (e.g., a snippet, cookie, etc.) may be injected into the response. In some cases, a scan of network ports may be undertaken. In some cases, certain port(s) may be tested with initial request(s), and other request(s) may be initiated based on the results from the initial requests, for example as determined by information in the database 512 of the device 510.

Passive techniques may also or instead be used to identify the device 510 in a manner sufficiently reliable for admission onto the network 502. This may include, for example, various techniques for fingerprinting or otherwise identifying the device 510 based on what the device 510 reports about itself including but not limited to network traffic, packet header information, status reports or other information that can be obtained from communications by the device 510 or among the device 510 and other devices on the network 502. For example, the portal 508 may analyze network traffic to or from the device 510. The portal 508 may also or instead analyze network information for the device 510 such as the MAC address, a machine name or identifier, an IP address, a default gateway address, DNS servers and so forth. The portal 508 may also or instead analyze information in network packet headers such as a source IP address, a destination IP address, a source port number, a destination port number, and an IP protocol number. The portal 508 may also or instead analyze DHCP or DNS requests made by the device. Devices may include an identifier, such as a MAC address or an IPv6 DHCP Unique Identifier (DUID).

The portal 508 may also or instead observe an authentication by the device 510 to a server within the system 500 or outside of the system 500. This may include observing the network address of the server. This may include observing HTTP or HTTPS requests made by the device 510. This may include HTTP Strict Transport Security (HSTS) pinning. This may include observing the communication of authentication credentials provided by the device 510. This may include observing the results of authentication, for example, whether authentication was successful, by observing the traffic communicated following the authentication. This may include interposing a gateway in between (i.e., a man-in-the-middle between) the device 510 and a server when the device 510 engages in an encrypted protocol to observe encrypted communication between the device 510 and a server.

The portal 508 may store a database 512 of devices that are known to the network 502 or threat management facility 506, such as devices that have been previously authorized to use the network 502 by a network administrator, or devices that have been admitted by the portal 508 using, e.g., the techniques described herein. When a new device such as the device 510 appears on the network 502, the device 510 may be redirected to the portal 508 where the portal 508 may initially compare the device 510 to the list of devices stored in the database 512 and make a preliminary decision whether to admit the device 510 based on the device identity or, where appropriate, credentials provided by the device 510 or a user of the device 510. The portal 508 may take active or passive measures to identify the device 510. Where the device 510 is not recognized, or the portal 508 otherwise is unable or refuses to admit the device 510 to the network 502 based on available information, the portal 508 may initiate a number of steps to conditionally admit the device 510 to the network 502. The portal 508 may also store device information for refused devices in the database 512 and maintain a list of such devices for future reference or for further action as contemplated herein.

It will be appreciated that, while the foregoing description contemplates admitted and non-admitted devices, any number of intermediate categories may also or instead be provided. For example, known and previously authorized devices for an enterprise may be configured to provide a secure heartbeat or the like to the portal 508 or threat management facility 506, and one list may be maintained for these devices that provide a heartbeat. Other devices may be refused entry on to the network 502, and the database 512 may provide an additional list of these devices (or they may be identified with a suitable, corresponding attribute in an aggregate list for all devices). Other devices may not be recognized but may, after scanning or the like, be determined to be sufficiently safe by the portal 508 or the threat management facility 506, e.g., by being otherwise in compliance with a security policy for the enterprise network 502. In some cases, limited network access may be granted to facilitate limited operation of the device 510 and, potentially, further information gathering and observation. A third, fourth, or more categories may be provided and a list of corresponding devices and network access restrictions may be stored in the database 512. Other categories, such as devices requiring human, administrative review or devices placed in a pool to be claimed by a device owner, may also or instead be stored in the database 512, along with any other categories necessary or useful for managing entry into an enterprise network as contemplated herein.

For example, in instances in which the device 510 is not recognized to be managed or manageable, the device 510 may be granted access to a limited set of high-reputation internet addresses, but not permitted to interact with other devices on the network. This may be accomplished, for example, with network configuration that limits communication to and from the device 510. This may be accomplished, for example, by assigning the device 510 to a VLAN that has limited network access to or from other devices on the network, or only to certain other devices and the portal 508. This may be accomplished by other techniques for preventing communication among devices on a network.

In one aspect, the portal 508 may present a landing page such as an HTML page for network traffic from new devices appearing on the network, e.g., via an HTTP redirects form another network device. The landing page may provide a human-readable interactive interface for admitting the device 510 onto the network 502. This may, for example, initiate steps such as download and execution of an antivirus scanner by the device 510. This may also or instead include download and installation of a local security agent by the device 510. This may also or instead include a scan of the device for compliance with a security policy, such as by checking for current application versions, security patches and so forth on the device 510.

Where the portal 508 does not receive a response to the landing page, or the landing page is not requested by or presented to the device 510 for some other reason, the portal 508 may use other techniques such as any of those described above to attempt to identify the device 510. While the absence of a response may have any of a number of user-related causes, such as where a user chooses not to join the network 502, or is a malicious user that does not wish to be identified, the absence of a response may also result from limitations of the device 510 itself. For example, a variety of devices such as smart watches, ebooks, network-capable appliances or utilities and so forth, may have wireless networking capabilities but no graphical user interface for interacting with network content.

In some implementations, for example, where no response to the landing page is received, or where the device 510 is not recognized as a device capable of supporting user interaction with the landing page, or where the device 510 is recognized as a device that is not capable of supporting user interaction with the landing page, the device 510 may be stored in a list of pending devices in the database 512. In one aspect, the portal 508 may usefully publish a list of such pending devices, e.g., on an unclaimed device page, so that authorized users of the enterprise network can claim the devices and register them as safe for use on the network 502 or otherwise identify them for subsequent handling within the context of the network 502. Thus, a user who wishes to add the device 510 to the network 502, even where the device 510 cannot independently support user interactions for registration through the portal 508, may visit the unclaimed device page, scan unclaimed devices for the device 510, and then register or otherwise identify the device 510 so that the device 510 can be admitted onto the network 502.

In another aspect, network entry decisions may be provided to an administrator. This may include an entry in the manner described above. For example, where an unknown device attempts to access the network 502 using the landing page described above, an admission decision may be presented to the administrator through any suitable interface, either before or after the device 510 has completed steps that are otherwise required to bring the device 510 into compliance with an enterprise network security policy. The administrator may usefully receive a wide range of contextual information to assist in making a network admission decision including machine identification information, fingerprint(s), cookies, network addresses, network traffic patterns and any of the other information described herein.

In some implementations, a new device may be associated with a known or managed device, or with a user associated with the known or managed device, based on the time that the new device and the known device join the network. A device may be associated with another device or with a user using any suitable technique. For example, a user identifier or authentication credentials used by a user on more than one device may be detected. Further, or instead, network addresses or URLs accessed may be relatively unique to a user. Still further or instead, communication (e.g., administration or operational traffic) between the new device and another device may be detected on the network.

In some implementations, patterns or timing of network traffic may be useful for managing devices that require configuration. For example, if a new device is observed to join a network at the same time as one or more other devices of a user, it may be the case that the user has just arrived in the location of the network with his or her devices, including the new device. It may be that the new device was just configured by the user. Some IoT devices initially provide a private wireless network, and an owner of the device can connect a client (e.g., a phone or a laptop) to the provided private wireless network and communicate with the device using the private wireless network. Once connected to the private wireless network, for example, using an application or a web browser on the client, the owner can configure the new device to use the enterprise wireless network. Upon configuration, the new device may connect to the specified enterprise network. The owner may then change the client (e.g., phone or laptop) also to connect to the enterprise wireless network. When the known client device joins the network within a time threshold as the new device, the known client device and the new device may be identified as associated with one another. For example, messages may be directed to the owner of the known device (e.g., email, text messages, through a user interface, redirection of web traffic to the portal) to claim the new device in the portal. For example, an association with a known device or an owner may be provided on the portal to aid the owner or an administrator in identifying the new device.

Figure 6:
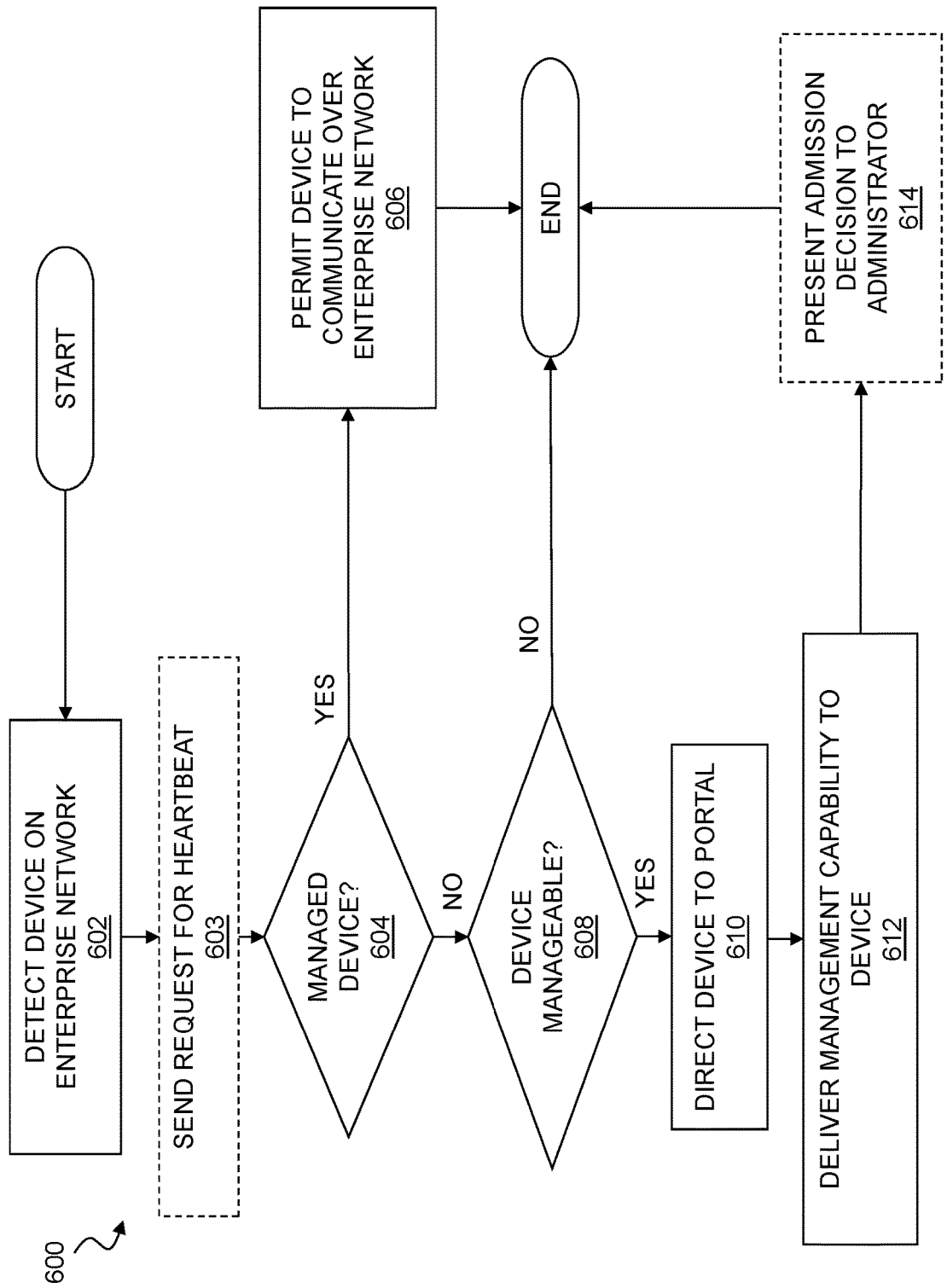
FIG. 6 is a flowchart of an exemplary method of managing admission of unrecognized devices onto an enterprise network.

FIG. 6 is a flowchart of an exemplary method 600 of managing admission of unrecognized devices onto an enterprise network. In general, unless otherwise specified or made clear from the context, the exemplary method 600 may be implemented by any one or more of the devices and systems described herein. Thus, for example, the exemplary method 600 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 600. As described in greater detail below, the exemplary method 600 may address the challenge of admitting unrecognized devices onto an enterprise network while managing risk exposure of a set of managed devices on the enterprise network, e.g., by bringing the unrecognized device(s) into compliance with a security policy for the enterprise network before permitting use of network resources and connectivity within the enterprise network.

As shown in step 602, the exemplary method 600 may include detecting a device on the enterprise network. The device may be any one or more of various different devices capable of network communication and, more specifically, capable of communicating or attempting to communicate over the enterprise network. It should be appreciated that devices capable of such network communication are ubiquitous and may have a variety of different features, depending, for example, on a particular application associated with the device. Thus, examples of such devices may include, but are not limited to, any one or more of the devices described herein. By way of example, therefore, the device may be one or more of a laptop computer, a desktop computer, a mobile phone, a wearable device (e.g., a watch), an appliance (e.g., a refrigerator, a thermostat, a smart speaker), and other similar devices.

Detection of the device on the enterprise network may be based on detecting connection of the device to the enterprise network. Such a connection may be any one or more of the different connections described herein. More specifically, connection of the device to the enterprise network may include a physical connection through an Ethernet port and/or a wireless connection to a wireless access point or other short range wireless interface. Detection of the device may include detection by another device on the network, such as an endpoint, router, gateway, firewall, as a few examples, that may monitor communication on the network. Detection of the device may include detection by a server receiving a request from the device, for example, for an Internet Protocol (IP) address using the DHCP protocol. Detection of the device may include detection by a server or an endpoint that is tracking the other devices on its local network by their network address (e.g., IP address or MAC address).

As shown in step 603, the exemplary method 600 may optionally include sending a request to the device for a heartbeat indicative of an identity of the device or the security status of the device. This request may be sent from the portal described herein, or from a threat management facility or other security resource for the enterprise network. For example, as described herein, when the device is directed to the portal as an unrecognized device, the portal may initially attempt to query a local security agent on the device. If the device has an appropriate local security agent installed, the device can respond to the query by generating and responding with a heartbeat. In turn the presence or absence of the heartbeat in response to the query from the portal may form a basis for the determination in step 604 regarding whether the device is one of a set of managed devices.

If the device is a managed device, when the device connects to the network, the device may begin communicating with a threat management or other security resource for the enterprise network. In the back-and-forth of communication, the threat management or other security resource may send a request to the device for a heartbeat indicative of an identity of the device or a security status of the device.

In some implementations, the portal may request that a gateway or threat management facility that receives heartbeats from devices forward any heartbeat from the device to the portal. The portal may request the heartbeat itself or information communicated by the device in the heartbeat, such as identity or security status.

As shown in step 604, the exemplary method 600 may include determining whether the device is one of a set of managed devices for the enterprise network. In certain implementations, determining whether the device is one of the managed devices of the set of managed devices for the enterprise network may be based on whether the device provides a heartbeat to the threat management facility, with the presence of the heartbeat generally identifying the device as one of the managed devices of the set of managed devices and, similarly, the absence of the heartbeat generally identifying the device as an unmanaged device. By way of example, heartbeat communication with the threat management facility may include use of any of the heartbeats described herein, such as any one or more of the various different heartbeats described above with respect to FIG. 4. Thus, the heartbeat may be digitally signed or otherwise cryptographically secured to prevent unauthorized access to heartbeat data and/or to authenticate identity of the source device, as described herein.

While determining whether the device is one of the managed devices may be based on the presence of absence of a heartbeat, it should be more generally appreciated that additional or alternative techniques for identifying a managed device may be used. As an example, a firewall may detect traffic from an unknown or unrecognized internal network address such as an unknown internal IP address. This may include any IP address or other network address associated with a device that is not in a database of known devices and/or does not carry endpoint protection. More generally, this may include any of the techniques described herein for distinguishing unmanaged devices including endpoint-side techniques, server/firewall-side techniques, active techniques (e.g., through query and response), passive techniques (e.g., through fingerprinting or the like) as well as combinations of the foregoing.

As shown in in step 606, when the device is determined to be one of the managed devices of a set of managed devices for the enterprise network, the exemplary method 600 may include permitting the device to communicate over the enterprise network. As used in this context, permission to communicate over the enterprise network may include partial or complete permission to communicate over the enterprise network, as may be appropriate for managing, for example, different types of devices, different types of users, and/or devices of varying provenance. Thus, for example, devices permitted to communicate over the enterprise network based on detection of a heartbeat may be permitted more complete access to the enterprise network as compared to devices directed to a portal and subsequently permitted to communicate over the enterprise network, as described below. Devices may have network communication restricted through use of routing policies, a VLAN, directing other devices, or other methods.

As also shown in step 606, when the device is not one of a set of managed devices, the exemplary method 600 may include carrying out the step 608 of determining manageability of the device. In general, determination of manageability of the device may be based on any one or more of various techniques useful for determining characteristics of a device. Such techniques may span general categories of passive techniques, active techniques, and combinations thereof, as described herein.

In certain implementations, determining manageability of the device may include identifying the type or category of device and, optionally, comparing the type or category of device to a database of manageable and/or unmanageable types or categories of devices. For example, devices determined to lack a user interface suitable for interacting with a portal (e.g., for interacting with a landing page administered by the portal) may be categorized as unmanageable. Devices determined to be unmanageable may be denied access or may otherwise be restricted with respect to the enterprise network at least until such time as additional information related to the device can be obtained, as described in greater detail below.

Determining the type or category of the device, and thus determining whether the device is manageable, may be based on a fingerprint associated with the device and/or on any other form of identification of the device based on what the device reports about itself. The fingerprint may be based, for instances, on network traffic to or from the device. For example, the device may be identified based at least in part on detecting updater traffic. That is, in instances in which the device attempts to access a site associated with updates for a smart speaker, such information may be useful in identifying the device as a smart speaker. In instances in which the device attempts to access a site associated with updates for a particular operating system (e.g., Microsoft Windows), such information may be useful in identifying the device as a Windows-based machine. Further, or instead, the identification of the device may be based on one or more of packet header information or status reports obtained from communications by or with the device.

In some implementations, determining manageability of the device may include determining the response of the device to network communication, for example, by testing ports of the device, or other techniques. As used in this context, ports of the device should be understood to refer generally to logical sub-addresses for a network connection that can be addressed and used independently. As a matter of convention, these ports may be allocated to particular protocols, process types, network services, resources types, users and so forth. Responses of a device to testing on these ports may form at least a partial basis for determining manageability of the device. For example, ports identifying specific service types, when open and responsive on the device, may be useful for identifying the type or category of the device.

As shown in in step 610, if the device is an unrecognized device and determined to be manageable by the threat management facility according to step 608, the exemplary method 600 may include directing the device to a portal. For example, directing the device to the portal may include proxy redirection of the device to the portal, or any other form of network forwarding or redirection suitable for directing the device to the portal. In general, the portal may manage admission of the unrecognized devices onto the enterprise network. The portal may, for example, advantageously provide a user-friendly way of providing support, updating, and the like, to unrecognized devices that are new to the enterprise network, or that have been locked out of the enterprise network or otherwise denied access to network resources. Further, or instead, the portal may facilitate managing admission of unrecognized devices onto the enterprise network while making efficient use of administrator resources, e.g., by facilitating automatic network registration without human administrative oversight, or by gathering sufficient contextual information for a human administrator to make informed decisions about admitting new devices onto the enterprise network.

As shown in step 612, the exemplary method 600 may include, at the portal, delivering device management capability to the device. It should be understood that delivery of such capability to the device may depend, generally, on the type of device to which the management capability is being delivered. As an example, a mode of delivery of device management capability may differ depending on whether the device is of a type including a user interface. Further, or instead, once the device management capability is delivered to the device, a degree of access granted to the device to communicate over the enterprise network may depend on the type of device. By way of example, therefore, a device including a user interface may be granted less restricted access to the enterprise network as compared to access granted to a device without a user interface.

In certain instances, delivering device management capability to the device may include presenting a landing page to the device. In general, the landing page may have any functionality useful for managing access of an unrecognized device to the network. Thus, for example, the landing page may include interactively guiding a user of the device through a network entry procedure, with the interaction including one or more of registering the device, receiving user login credentials, downloading software, downloading a cookie, and the like. As should be appreciated, presentation of a landing page to the device may be particularly useful for a device having a user interface. However, as described in greater detail below, whether or not a device responds to the presentation of a landing page may itself serve as a useful way to assess manageability of the device.

In some instances, delivering device management capability to the device at the portal may include installing a local security agent on the device. Installation of the local security agent may be typically carried out through the landing page presented to the device, although it should be understood that the use of a landing page is not required. Further, or instead, the local security agent may be any one or more of the local security agents described herein. Thus, once installed on the device, the local security agent may communicate with the threat management facility (e.g., by sending a heartbeat) to identify the device as a managed device. Installation of a local security agent may be temporary, for example, to carry out scanning, or may be required for the duration of network access.

Delivering device management capability to the device may, further or instead, include scanning the device for compliance with a security policy. For example, the device management capability delivered to the device may be based on the results of the scan. As an example, the scan may determine whether the device has a version of one or more software programs, such as a current version required for compliance with a security policy. Thus, continuing with this example, delivering device management capability to the device may include checking versions of one or more software programs, as necessary, to bring the device into compliance with the security policy, and optionally updating such software or instructing a device user to update such software as need to bring the device into compliance. Further, or instead, scanning the device for compliance with a security policy may include applying a virus scan or other malware detection tool to identify potentially malicious code on the device that may pose a threat to the enterprise network if the device were granted access to the enterprise network.

More generally, any techniques for bringing the device into compliance with a security policy for an enterprise network, or otherwise identifying the device as safe or manageable, may be used to deliver management capability to the device 612 as contemplated herein.

As shown in step 614, the exemplary method may optionally include presenting an admission decision related to the device to an administrator. Typically, such an admission decision may be presented to the administrator through a user interface at the threat management facility. Presentation of the admission decision to the administrator may be useful, for example, for allowing the administrator to retain a useful amount of control over admission decisions while still making efficient use of the administrator's resources. For example, the admission decision may be presented to the administrator following delivery of management capability to the device in step 612 such that only a subset of devices (e.g., those devices that are manageable and have successfully received device management capability) are presented to the administrator for an admission decision. The administrator may deny admission to a device if there is an unusual volume of unrecognized devices or, more generally, if admission of the unrecognized device would be inappropriate or inadvisable.

The admission decision presented to the administrator may be presented in any one or more of various different forms useful for managing admission of the device to the enterprise network. For example, the admission decision may be presented to the administrator as a yes/no decision. The administrator may also or instead be presented with context for a decision in order to inform a decision, such as the machine type, machine name, machine or network packet metadata and so forth, any of which may provide useful context for determining whether to admit a device onto an enterprise network. In one aspect, the admission decision may be presented to the administrator with one or more options useful for managing devices that are granted access to the enterprise network. For example, the admission decision by the administrator may include limiting a degree of access granted to the device.

While managing admission of unrecognized devices onto an enterprise network has been described as including directing the device to a portal based on whether the device is manageable, it should be appreciated that an interaction between the device and the portal may itself be useful for identifying the device and/or determining whether the device is manageable. For example, certain devices may be unable to interact with the portal. In certain instances, admission of these devices to the enterprise network may require additional information to be input (e.g., by a user associated with the device).

Figure 7:
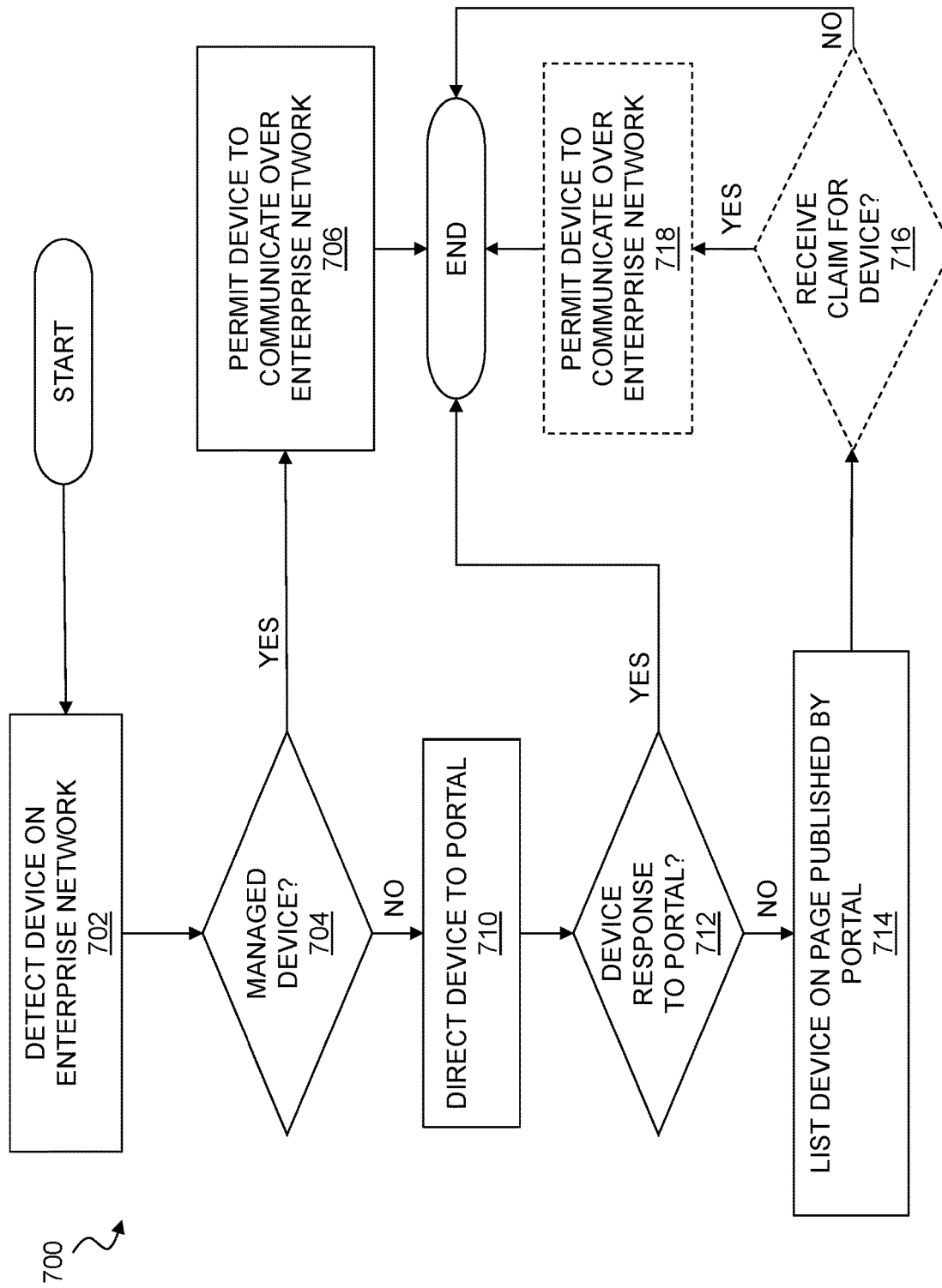
FIG. 7 is a flowchart of an exemplary method of using portal response for managing admission of unrecognized devices onto an enterprise network.

FIG. 7 is a flowchart of an exemplary method 700 of using portal response for managing admission of unrecognized devices onto an enterprise network. In general, unless otherwise specified or made clear from the context, the exemplary method 700 may be implemented using any one or more of the devices and systems described herein. Thus, for example, the exemplary method 700 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 700. As described in greater detail below, the exemplary method 700 may address the challenge of providing robust support to unrecognized devices—particularly devices spanning a wide range of user interfaces and capabilities—for admission to an enterprise network while managing risk exposure of a set of managed devices on the enterprise network.

As shown in step 702, the exemplary method 700 may include detecting a device on an enterprise network. As shown in step 704, the exemplary method 700 may include determining whether the device is one of a set of managed devices for the enterprise network. As shown in step 706, when the device is identified as one of the set of managed devices for the enterprise network in step 704, the exemplary method 700 may include permitting the device to communicate over the enterprise network. Unless otherwise specified or made clear from the context, it should be appreciated that steps 702, 704, and 706 in the exemplary method 700 are analogous to the respective steps 602, 604, and 606 of the exemplary method 600 described above with respect to FIG. 6.

As shown in step 710, when the device is determined to be an unrecognized device in step 704, the exemplary method 700 may include directing the device to a portal for admission of unrecognized devices onto the enterprise network. The portal may be any one or more of the portals described herein and, thus, may include a landing page for interactively delivering device management capability to a device. For example, in instances in which the device includes a user interface and is generally compatible with interaction with the landing page, a user associated with the device may be guided through one or more steps for delivery of device management capability of the device, e.g., as generally described above. Examples of such steps may include one or more of receiving login credentials from the user, prompting the user to download software such as a security agent, receiving registration information for the device, and the like.

As shown in step 712, the exemplary method 700 may include determining a response of the device to the portal. In instances in which the device responds to the portal (in a manner consistent with administration/management of the device), the portal may deliver device management capability to the device according to any one or more of the techniques described herein and, in particular, as described above with respect to step 612 in FIG. 6. However, in instances in which the device does not respond to the portal or responds incorrectly or inadequately to the portal, such responses may indicate that the device is not manageable in a manner consistent with the security policy for the enterprise network. More specifically, unresponsiveness or incorrect responses by the device in response to the portal, may indicate that the device is an unmanageable device. As described in greater detail below, additional information may be required as a condition for permitting such unmanageable devices to communicate over the enterprise network.

In general, it should be appreciated that the portal may store information about registered devices, device types and so forth. Thus, the presence, absence, and/or type of response of the device to the portal may provide an indication of the manageability of the device. For example, determining the response of the device to the portal may include determining whether the device responded to a landing page administered by the portal, or to a redirect intended to direct the device to the landing page. In certain instances, the determination of the response of the device to the portal may include a timeout feature providing a predetermined period of time for responding to the portal, after which the device may be denied further access to enterprise network resources. Further, or instead, the determination of the response of the device to the portal may result in a determination of "no response" when incorrect responses are submitted by the device in response to prompts provided by the portal (e.g., incorrect login credentials, incorrect responses to a challenge-response test, and other prompts useful for identifying a user and/or a device).

As shown in step 714, the exemplary method 700 may include, based on the response of the device to the portal determined in step 712, listing the device on an unclaimed device page published by the portal and accessible to authorized users of the enterprise network. This usefully provides a repository for devices that appear unmanageable, e.g., because they are unknown or because they cannot be brought into compliance with a security policy for the enterprise network. Listing the device on the unclaimed device page may be subject to approval/editing by an administrator. That is, an administrator may remove or deny listing for a device otherwise meeting criteria for being listed on the unclaimed device page if, e.g., the administrator determines that the device cannot or should not be permitted access to network resources.

A listing for the device on the unclaimed device page may include any of various different types of information related to or known about the device. Further, or instead, the portal may request any of various different types of information related to the device, the authorized user, or both, as a condition or conditions for listing the device and/or allowing an authorized user to claim the device and/or as a condition or conditions for allowing different degrees of access to the enterprise network. Examples of information that may be requested by the portal for use with the unclaimed device page may include one or more of the device type, device serial number, registration information, user credentials, and other similar information useful for identifying the device and associating the device with the authorized user.

While listing the device on the unclaimed device page may be based on the response of the device to the portal determined in step 712, it should be appreciated that a decision to publish the device on the unclaimed device page, or the decision to include various types of device information, may be additionally based on other information gathered about the device. In general, such information about the device may be gathered according to any one or more of the techniques described herein. Thus, for example, listing the device on the unclaimed device page may be further based on, or the listing may include, a fingerprint of the device according to any one or more of the fingerprinting techniques described herein. Further, or instead, listing the device on the unclaimed device page may be based on performing a security scan of the device for compliance with a security policy. Continuing with this example, in instances in which the device is not in compliance with a security policy, the device may be denied listing on the unclaimed device page and/or additional information related to the device may be required as part of the process for listing and/or claiming the device.

In some implementations, the unclaimed device page may list a full inventory of unmanaged devices detected on the enterprise network and, further or instead, the unclaimed device page may distinguish unmanaged but manageable endpoints from unmanageable endpoints (e.g., through the use of different visual indicia). Further, or instead, the unclaimed device page may include a report showing one or more characteristics known about the unmanaged devices, with such characteristics including, for example, one or more of an operating system, an operating system version, a current IP address, and the like. In general, the information presented on the unclaimed device page may be any manner and form of information useful for facilitating identification of an unmanaged device that an authorized user wishes to claim. In addition, or in the alternative, the information presented on the unclaimed device page may be based on permissions for a particular authorized user to which the unclaimed devices page is presented. Still further, or instead, an administrator may be able to see a full inventory of devices on the network, with managed and unmanaged devices identified and, optionally, with potentially manageable devices flagged for possible action by the administrator.

As shown in step 716, the exemplary method 700 may, optionally, include receiving, from an authorized user of the enterprise network, a claim for the device from the unclaimed device page. The received claim may include any of various different types of information useful for associating the device with the authorized user. Thus, for example, receiving the claim may include registering the device in a database stored by the threat management facility. Such registration in a database may be useful for recognizing the device when the device is subsequently detected by the enterprise network which may, for example, be useful for efficiently providing access to mobile devices. As used herein, registration of the device may include obtaining and/or storing any information useful for identifying one or more of the device, the authorized user, and an association between the device and the authorized user.

As shown in step 718, the exemplary method 700 may, optionally, include permitting the device to communicate over the enterprise network based on the claim for the device on the unclaimed device page. In certain implementations, the permitting the device to communicate over the enterprise network in step 718 may include the same degree of permission provided to a device permitted to communicate over the enterprise network in step 706. It should be appreciated, however, that this may not be the case in certain implementations. For example, a greater degree of permission may be granted to devices via step 706 than may be granted to devices via step 718. More specifically, it may be useful to provide only limited access to a device that has been claimed from the unclaimed devices page, as such devices may pose an increased security risk as compared to managed devices.

While a response (or absence of a response) of a device to a portal has been described as being a basis for listing the device on an unclaimed devices page, it should be appreciated that additional or alternative criterion may be usefully applied as conditions to listing a device on an unclaimed devices page. For example, any one or more of the techniques for determining device manageability described herein may be used to determine whether a device is listed on an unclaimed device page published by a portal. Such additional techniques for determining device manageability may be particularly useful, for example, in instances in which a device is unresponsive to the portal but is nevertheless manageable. As a specific example, unresponsiveness of a device to the portal may be based on a choice made by a user associated with the device, although the device itself may be a manageable device.

Figure 8:
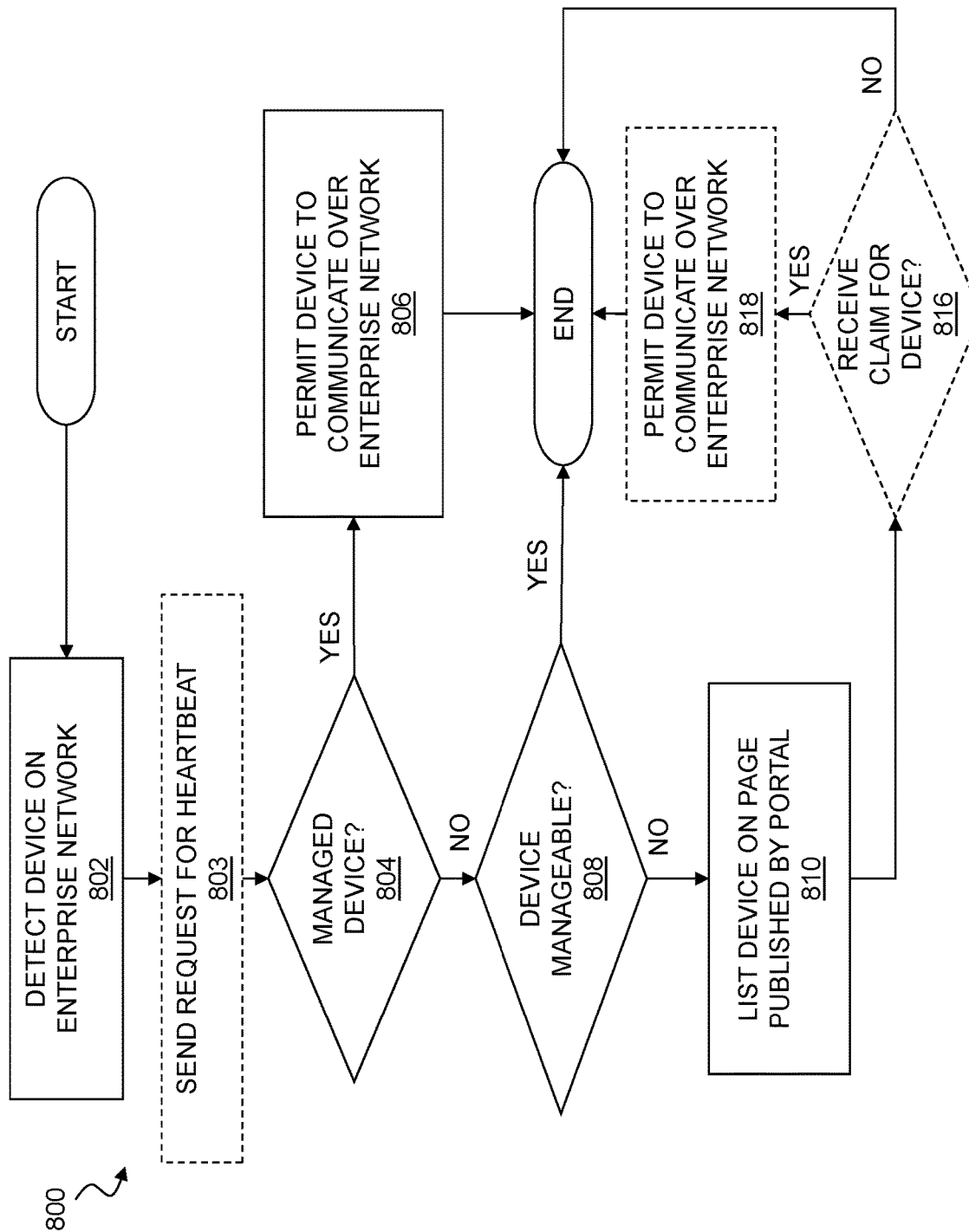
FIG. 8 is a flowchart of an exemplary method of managing claiming of unclaimed devices for admission to an enterprise network.

FIG. 8 is a flowchart of an exemplary method 800 of managing claiming of unclaimed devices for admission to an enterprise network. In general, unless otherwise specified or made clear from the context, the exemplary method 800 may be implemented using any one or more of the devices and systems described herein. Thus, for example, the exemplary method 800 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 800. The exemplary method 800 may combine certain features of the exemplary method 600 (FIG. 6) and the exemplary method 700 (FIG. 7) to address the challenge of providing robust categorization and support of unrecognized devices—particularly devices spanning a wide range of user interfaces and capabilities—for admission to an enterprise network while managing risk exposure of a set of managed devices on the enterprise network.

As shown in step 802, the exemplary method 800 may include detecting a device on an enterprise network. As shown in step 804, the exemplary method 800 may include determining whether the device is one of a set of managed devices for the enterprise network. As shown in step 806, when the device is identified as one of the set of managed devices for the enterprise network in step 804, the exemplary method 800 may include permitting the device to communicate over the enterprise network. Unless otherwise specified or made clear from the context, it should be appreciated that steps 802, 804, and 806 in the exemplary method 800 are analogous to the respective steps 602, 604, and 606 of the exemplary method 600 described above with respect to FIG. 6.

As shown in step 808, the exemplary method 800 may include, when the device is not identified as one of the set of managed devices in step 804, determining manageability of the device. In general, determining manageability of the device in step 808 may be based on any one or more of the techniques for determining manageability described herein. Thus, unless otherwise specified or made clear from the context, determining manageability in step 808 shall be understood to be analogous to determining manageability in step 608 described above with respect to FIG. 6. Further, in instances in which the device is determined to be a manageable device in step 808, device management capability may be delivered to the device according to any one or more of the various different methods described herein and, in particular, according to steps 610 and 612 described above with respect to FIG. 6.

As shown in step 810, the exemplary method 800 may include, when the device is not a manageable device, listing the device on an unclaimed device page accessible by authorized users of the enterprise network and published by a portal for admission of unrecognized devices onto the enterprise network. Unless otherwise, specified or made clear from the context, listing the device on the unclaimed device page according to step 810 should be understood to be analogous to listing a device on an unclaimed device page according to step 714 described above with respect to FIG. 7. Thus, for example, listing the device on the unclaimed device page may include performing a security scan of the device for compliance with a security policy.

As shown in step 803, the exemplary method 800 may, optionally, include sending a request from the portal to the device for a heartbeat indicative of an identity of the device. This query from the portal to the device may be analogous, for example, to the query described above with respect to step 603 in FIG. 6.

As shown in step 816, the exemplary method 800 may, optionally, include receiving, from an unauthorized user of the enterprise network, a claim for the device from the unclaimed device page. In general, the receipt of the claim in step 816 should be understood to be analogous to the receipt of the claim in step 716 described above in FIG. 7. Thus, for example, receiving the claim may include registering the device in a database stored by the threat management facility.

As shown in step 818, the exemplary method may, optionally, include permitting the device to communicate over the enterprise network based on the claim for the device from the unclaimed device page. Permitting the device to communicate over the enterprise network according to step 818 should be understood to be analogous to the permission provided for in step 718 described above in FIG. 7. Accordingly, it should be appreciated that permission granted to a managed device in step 806 may differ from permission granted to a claimed device in step 818.

In one aspect, the network permissions granted in step 818 may be different, or substantially different, than network permissions granted to other endpoints. For example, where a user attempts to claim a smart device such as a personal health monitoring device, web camera, or other network-enabled device, the device may be determined to be unmanageable, but may be permitted limited network access, e.g. to a user-controlled endpoint such as a desktop computer where the user controls the device, or a remote service that the device couples to. By limiting network communications in this manner, and by notifying other managed devices to avoid communications with the device, network capabilities of the device can be enjoyed by the user/owner, while limiting exposure of other endpoints in the enterprise network to the device.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
   detecting a device on an enterprise network;
   when the device provides a heartbeat to a threat management facility that identifies the device as one of a set of managed devices for the enterprise network, permitting the device to communicate over the enterprise network; and
   when the device does not provide the heartbeat to the threat management facility that identifies the device as one of the set of managed devices, directing the device to a portal for admission of unrecognized devices onto the enterprise network, determining a response of the device to the portal, and, (i) based on the response of the device to the portal inconsistent with a delivery of a local security agent for device management capability to the device from the threat management facility, listing the device on an unclaimed device page published by the portal and available to authorized users of the enterprise network to claim on the enterprise network, and receiving a claim for the device inconsistent with the delivery of the local security agent from one of the authorized users through the unclaimed device page, and (ii) based on the response of the device consistent with the delivery of the local security agent, providing the local security agent to the device.

2. The method of claim 1, further comprising receiving, from an authorized user of the enterprise network, a claim for the device from the unclaimed device page.

3. The method of claim 2, wherein receiving the claim for the device includes registering the device in a database stored by the threat management facility.

4. The method of claim 2, further comprising permitting the device to communicate over the enterprise network based on the claim for the device from the unclaimed device page.

5. The method of claim 1, wherein determining the response of the device to the portal is based on a response of the device to being directed to a landing page published by the portal.

6. The method of claim 5, wherein the device is listed on the unclaimed device page published by the portal if the device does not respond to the landing page.

7. The method of claim 1, wherein listing the device on the unclaimed device page is further based on a fingerprint of the device.

8. The method of claim 7, wherein the fingerprint of the device is based on one or more of network traffic, packet header information, or status reports obtained from communications by the device.

9. The method of claim 1, wherein listing the device on the unclaimed device page is further based on associating the device with another device.

10. A computer program product encoded on one or more non-transitory computer storage media, the computer program product comprising instructions that, when executed by one or more computing devices, cause the one or more computing devices to perform operations comprising:
    detecting a device on an enterprise network;
    when the device provides a heartbeat to a threat management facility that identifies the device as one of a set of managed devices for the enterprise network, permitting the device to communicate over the enterprise network; and
    when the device does not provide a heartbeat to the threat management facility that identifies the device as one of the set of managed devices, directing the device to a portal for admission of unrecognized devices onto the enterprise network, determining a response of the device to the portal, and, (i) based on the response of the device to the portal inconsistent with a delivery of a local security agent for device management capability to the device from the threat management facility, listing the device on an unclaimed device page published by the portal and available to authorized users of the enterprise network to claim on the enterprise network, and receiving a claim for the device inconsistent with the delivery of the local security agent from one of the authorized users through the unclaimed device page, and (ii) based on the response of the device consistent with the delivery of the local security agent, providing the local security agent to the device.

11. The computer program product of claim 10, the operations further comprising receiving, from an authorized user of the enterprise network, a claim for the device from the unclaimed device page.

12. The computer program product of claim 11, wherein receiving the claim for the device includes registering the device in a database stored by the threat management facility.

13. The computer program product of claim 11, the operations further comprising permitting the device to communicate over the enterprise network based on the claim for the device from the unclaimed device page.

14. The computer program product of claim 10, wherein determining the response of the device to the portal is based on a response of the device to being directed to a landing page published by the portal.

15. The computer program product of claim 14, wherein the device is listed on the unclaimed device page published by the portal if the device does not respond to the landing page.

16. The computer program product of claim 10, wherein listing the device on the unclaimed device page is further based on a fingerprint of the device.

17. The computer program product of claim 10, wherein listing the device on the unclaimed device page is further includes performing a security scan of the device for compliance with a security policy.

18. A system comprising:
a portal for managing admission of unrecognized devices onto an enterprise network, the portal including a first memory and a first processor, the first memory having stored thereon computer executable instructions for causing the first processor to publish an unclaimed device page accessible to authorized users of an enterprise network; and
a threat management facility associated with the enterprise network and in communication with the portal, the threat management facility including a second memory and a second processor, the second memory having stored thereon computer executable instructions for causing the second processor to identify a device as one of a set of managed devices for the enterprise network when the device provides a heartbeat to the threat management facility, to permit the device to communicate over the enterprise network when the device is one of the set of managed devices, and, when the device does not provide the heartbeat to the threat management facility identifying the device as one of the set of managed devices, (i) based on a response to the portal inconsistent with a delivery of a local security agent for device management capability to the device from the threat management facility, to list the device on the unclaimed device page published by the portal and available to the authorized users of the enterprise network to claim on the enterprise network, and to receive a claim for the device inconsistent with the delivery of the local security agent from one of the authorized users through the unclaimed device page, and (ii) based on a response consistent with the delivery of a local security agent for device management capability to the device from the threat management facility, to provide the local security agent to the device.

19. The system of claim 18, wherein the second memory of the threat management facility has further stored thereon instructions to further cause the second processor to permit the device to communicate over the enterprise network based on the claim for the device from the unclaimed device page.

* * * * *